United States Patent
Sesky et al.

[15] 3,695,727
[45] Oct. 3, 1972

[54] TRACTION ATTACHMENT FOR VEHICLES

[72] Inventors: Julius Sesky, CMR 2515 456 AMMS, Beale Air Force Base, Calif. 95903; Charles J. Clark, 3023 Winlock Road, Torrance, Calif. 90505

[22] Filed: Sept. 25, 1970

[21] Appl. No.: 75,444

[52] U.S. Cl. ........................ 301/43, 180/6, 180/8 R, 180/15, 180/16, 280/28.5, 305/1
[51] Int. Cl. ............................................. B60b 15/22
[58] Field of Search ....... 180/15, 16, 8 F, 6, 7 R, 8 R, 180/8 B; 305/1; 301/43, 44 R, 44 A, 44 B; 285/421; 280/28.5

[56] References Cited

UNITED STATES PATENTS

| | | | |
|---|---|---|---|
| 3,128,128 | 4/1964 | Jines | 301/44 R |
| 2,240,261 | 4/1941 | Hodell | 301/44 R |
| 1,073,520 | 9/1913 | Rastello | 180/44 |
| 681,090 | 8/1901 | White | 285/421 UX |
| 1,154,423 | 9/1915 | Mathews | 180/8 F |
| 1,692,798 | 11/1928 | Potter | 285/421 X |

FOREIGN PATENTS OR APPLICATIONS

| | | | |
|---|---|---|---|
| 181,790 | 12/1962 | Sweden | 301/43 |

*Primary Examiner*—Kenneth H. Betts
*Assistant Examiner*—John P. Silverstrim
*Attorney*—Alexander B. Blair

[57] ABSTRACT

A traction attachment for vehicles which consists of a spoked hub having three or more spokes extending outwardly therefrom and mounted on a center rotatable hub for meshing with obstacles in the terrain. The hub is provided with a sprocket or gear over which a drive chain or actuator is trained extending from an engine. The axis of the spoked hub varies from the horizontal to nearly vertical. In a modified form of the invention a belt is secured to the spoked hub to extend thereabout for improved floatative traction. The spoked hub can be attached to any type of land vehicle, water vehicle or snow and ice vehicles as required.

7 Claims, 21 Drawing Figures

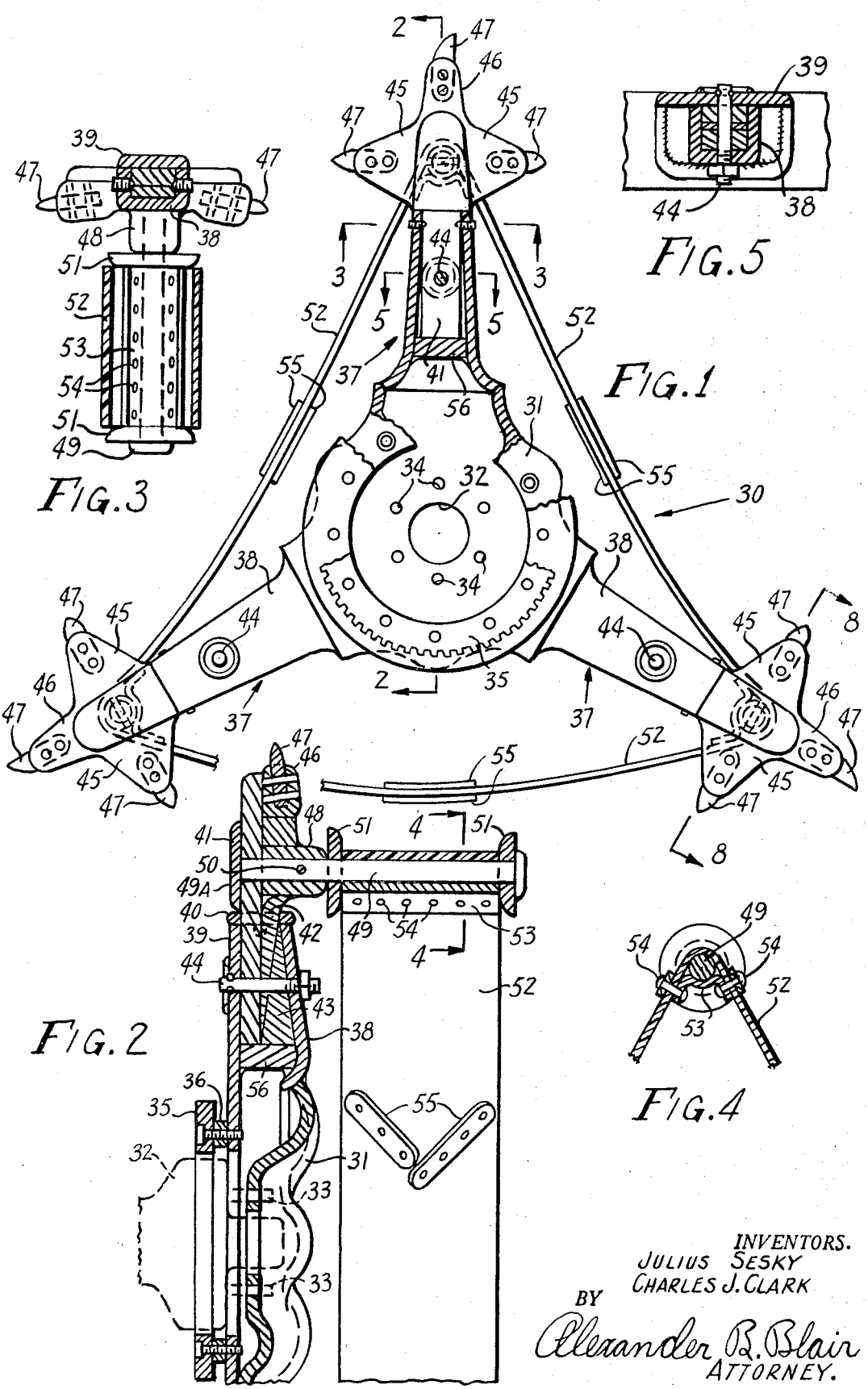

INVENTORS.
JULIUS SESKY
CHARLES J. CLARK
BY Alexander R. Blair
ATTORNEY.

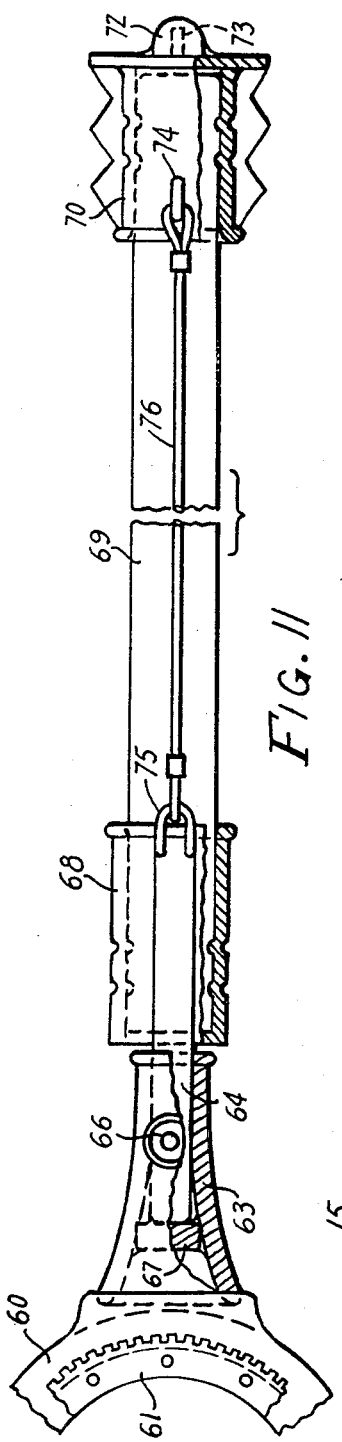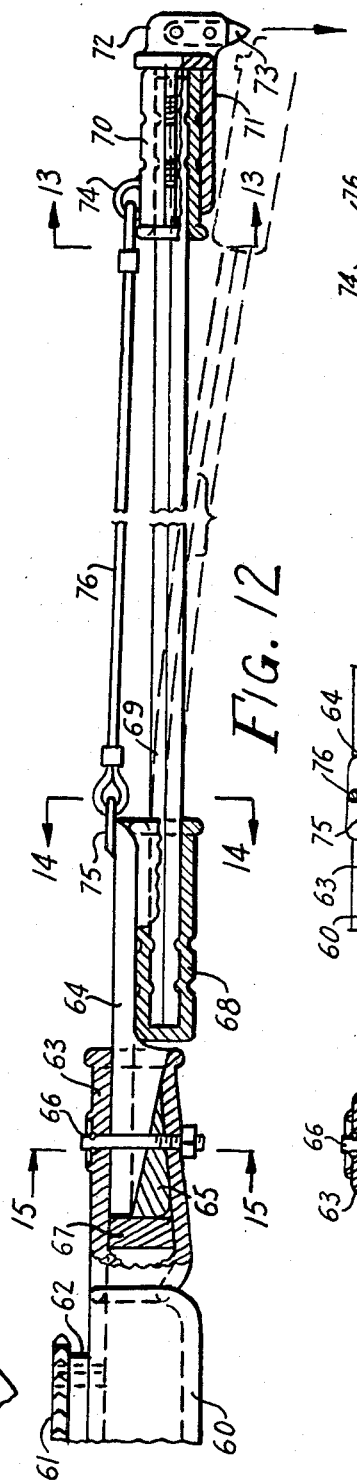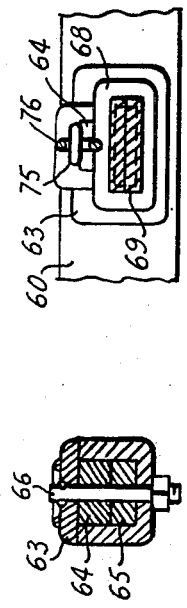

INVENTORS.
JULIUS SESKY
CHARLES J. CLARK

INVENTORS.
JULIUS SESKY
CHARLES J. CLARK
BY Alexander B. Blair
ATTORNEY.

TRACTION ATTACHMENT FOR VEHICLES

BACKGROUND OF THE INVENTION

Field of the Invention

The present invention relates to traction increasing attachments for vehicles and particular to such devices which are independently driven.

Summary of the Invention

A driven spoked hub is mounted on a vehicle for rotation about a pivot varying from the horizontal to nearly vertical pivot with the spoked hub being adapted to be provided with a belt for increased tractive efford.

The primary object of the invention is to provide a traction increasing drive attachment for vehicles which can be used with land, water and snow or ice vehicles for traveling over and obtaining traction with relatively rough terrain.

Other objects and advantages will become apparent in the following specification when considered in the light of the attached drawings.

BRIEF DESCRIPTION OF THE DRAWINGS

FIG. 1 is a side elevation of the invention shown partially broken away and in section for convenience of illustration;

FIG. 2 is a fragmentary sectional view taken along the line 2—2 of FIG. 1 looking in the direction of the arrows;

FIG. 3 is a transverse sectional view taken along the line 3—3 of FIG. 1 looking in the direction of the arrows;

FIG. 4 is a longitudinal sectional view taken along the line 4—4 of FIG. 2 looking in the direction of the arrows, with parts broken away for convenience of illustration;

FIG. 5 is a horizontal sectional view taken along the line 5—5 of FIG. 1 looking in the direction of the arrows, with parts broken away for convenience of illustration;

FIG. 11 is a top plan view shown partially broken away and in section for convenience of illustration of a modified form of the invention;

FIG. 12 is a side elevation of the device illustrated in FIG. 11 with parts broken away and in section for convenience of illustration;

FIG. 13 is a vertical sectional view taken along the line 13—13 of FIG. 12 looking in the direction of the arrows;

FIG. 14 is a vertical sectional view taken along the line 14—14 of FIG. 12 looking in the direction of the arrows;

FIG. 15 is a fragmentary vertical sectional view taken along the line 15—15 of FIG. 12 looking in the direction of the arrows;

DESCRIPTION OF THE PREFERRED EMBODIMENTS

Figure 6:
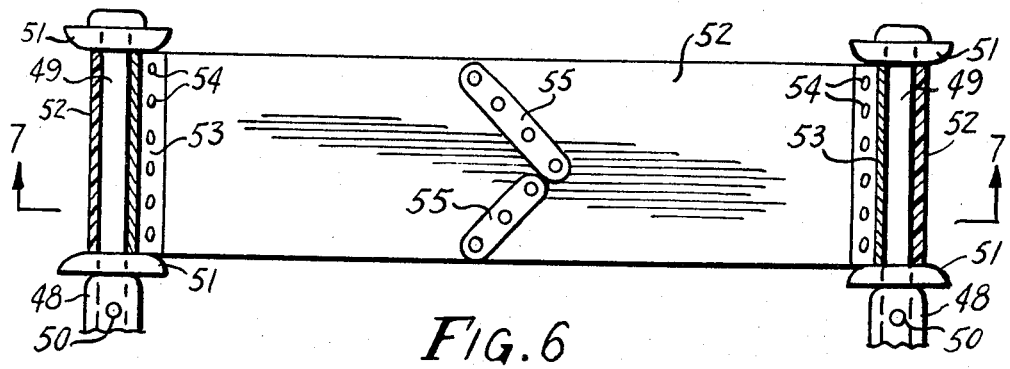
FIG. 6 is a plan view of the drive belt used with the invention of FIG. 1.
Figure 7:
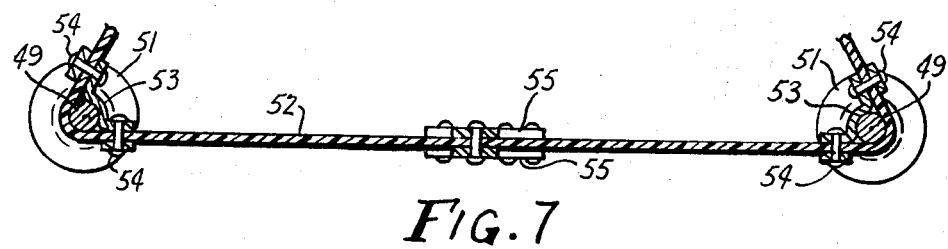
FIG. 7 is a vertical sectional view taken along the line 7—7 of FIG. 6 looking in the direction of the arrows.
Figure 8:
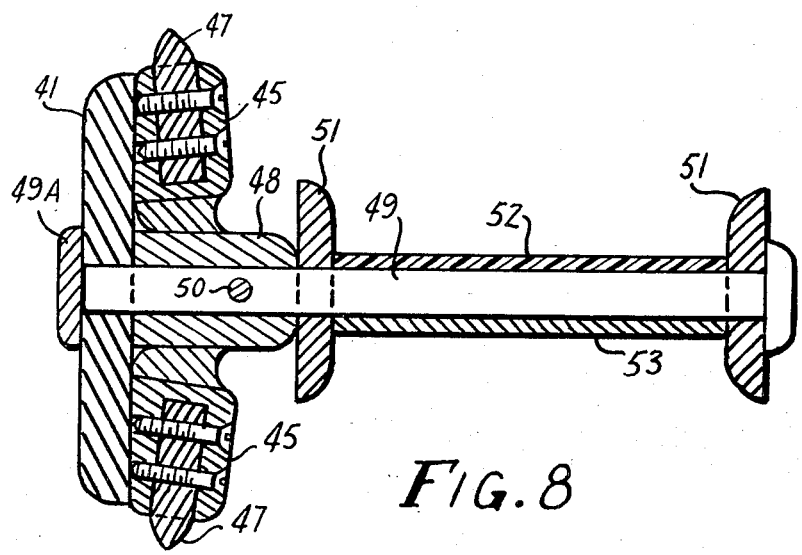
FIG. 8 is an enlarged fragmentary sectional view taken along the line 8—8 of FIG. 1 looking in the direction of the arrows.

Referring now to the drawings in detail wherein like reference characters indicate like parts throughout the several figures the reference numeral 30 indicates generally a traction increasing member constructed in accordance with the invention.

The member 30 includes a convoluted hub 31 having a central opening 32 formed therein. The hub 31 is adapted to be mounted on an axle carried drum 32 by means of a plurality of stud bolts 33 which extend through bores 34 in the hub 31. A toothed sprocket or ring gear 35 is secured to the inner face of the hub 31 with a spacer 36 mounted therebetween.

Three or more spokes indicated generally at 37 are secured to the hub 31 in equi-spaced radially outwardly projecting form. The spokes 37 include a tapered channel member 38 welded to the hub 31 at its inner end and having a cover plate 39 welded thereto to form a socket. A spoke socket collar 40 surrounds each of the spoke sockets formed by the channel members 38 and cover plates 39 to prevent spliting out of the spoke socket.

A wedged fluke plate 41 extends to mate with the wedged spoke socket, the pair of wedge plates 42, 43 are thus integrally mounted in the spoke socket to bind the wedged fluke plate 41 therein. A bolt 44 extends through the spoke 37, the fluke plate 41 and wedge plates 42, 43 as can be seen in FIG. 2 to lock them together.

Each of the fluke plates 41 have a pair of laterally extending flukes 45 integrally secured thereon with a radial fluke 46 integrally secured thereto and extending radially outwardly therefrom. A carbide tip 47 is detachably secured to each of the flukes 45, 46 for reasons to be assigned. A socket 48 is integrally secured to the fluke plate 41 and extends horizontally outwardly therefrom. A shaft 49 having a head 49$^a$ is detachably secured in the socket 48 by means of a pin 50 projecting therethrough. A pair of retainer washers 51 are mounted on the shaft 49 to support a belt 52 therebetween. A pocket forming member 53 is secured to the belt 52 by means of rivets 54 and the shaft 49 extends through the pocket formed thereby.

Spaced annular cleats 55 are secured to the belt 52 on opposite sides thereof to splice the belt 52 and provide extra traction.

Figure 9:
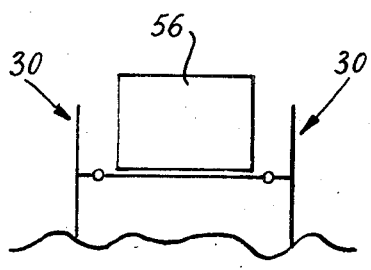
FIG. 9 is a diagrammatic view illustrating the attachment of the invention to a vehicle.
Figure 10:
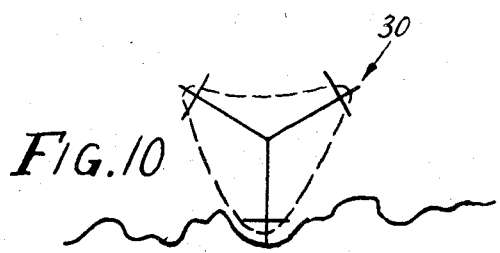
FIG. 10 is a diagrammatic view illustrating the engagement of the invention with the terrain.

The traction device 30 may be mounted on any vehicle as a replacement for, or additionally mounted thereto on any one of the conventional tractive wheels of the vehicle or as an auxiliary driving device completely independent of the normal supporting or tractive wheels of the vehicle. In the latter case the sprocket or ring gear 35 is used to provide a chain or otherwise actuated drive for the device and it may be raised and lowered by any suitable means to function as required. The belt 52 and the shafts 49 may be used in some terrains and in others would be completely removed as unnecessary. The spoke sockets each have a stop plate 56 in the bottom thereof to assist in aligning the fluke plates 41 at radially outwardly equispaced locations. The carbide tips 47 prevent undo wear on the fluke plate 41 and are replaced as worn to insure the traction of the device 30. FIG. 9 illustrated one angular mounting of the device 30 when using to drive a vehicle 56. FIG. 10 illustrated the grip that the device 30 obtains when traveling over rough terrain.

Figure 16:
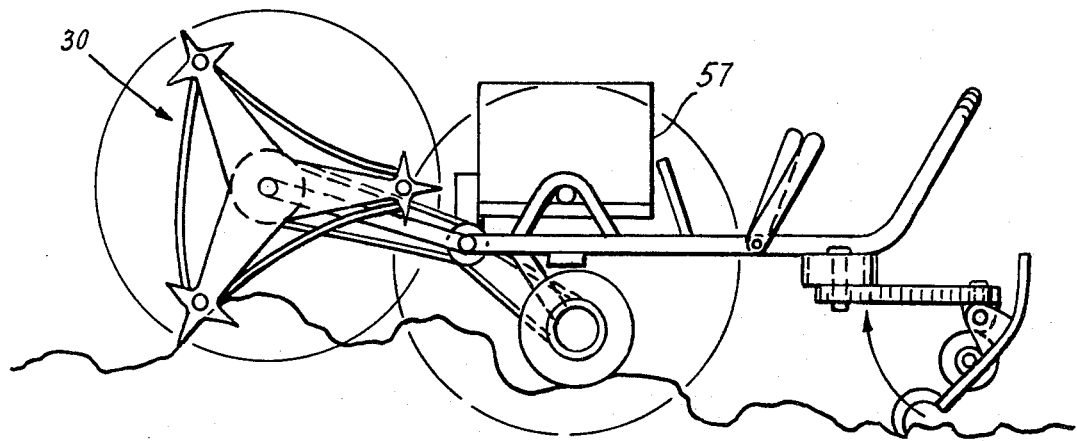
FIG. 16 is a side elevation of a vehicle having the invention as illustrated in FIG. 1 attached thereto.
Figure 17:
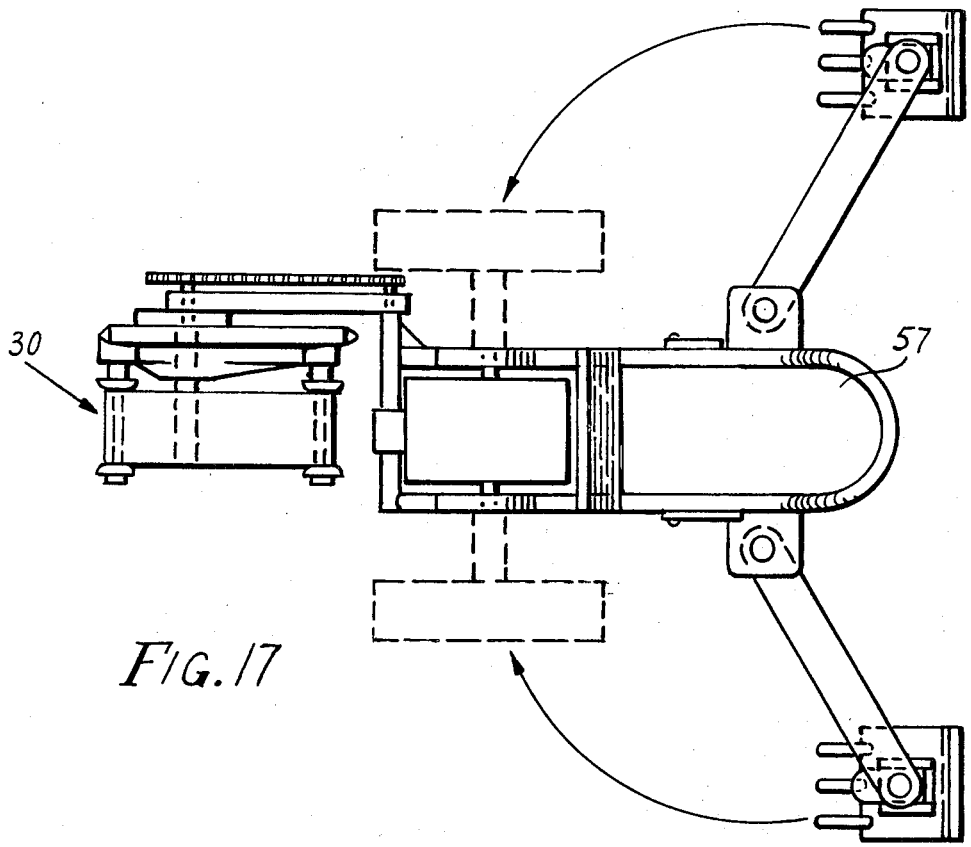
FIG. 17 is a top plan view of the structure illustrated in FIG. 16.

FIGS. 16 and 17 illustrate another form of the vehicle 57 with the device 30 mounted thereon.

Figure 18:
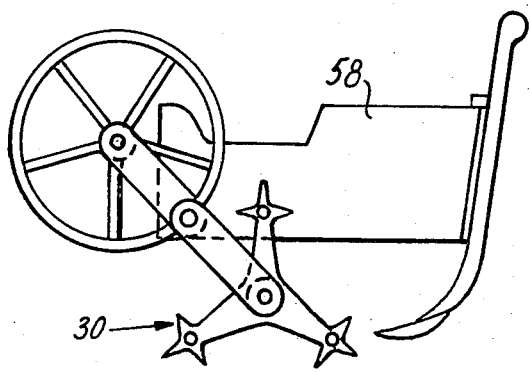
FIG. 18 is a side elevation of another vehicle having the invention as illustrated in FIG. 1 attached thereto.
Figure 19:
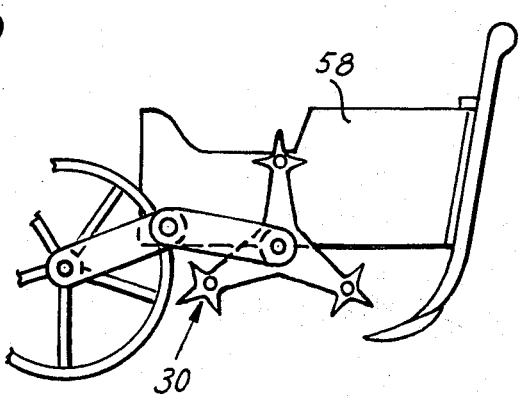
FIG. 19 is a view similar to FIG. 18 showing the wheel drive member in retracted position.

FIGS. 18 and 19 illustrate still another form of vehicle 58 with the device 30 mounted thereon. FIG. 18 illustrates the device 30 in lowered operative position and FIG. 19 illustrates the device 30 in raised inoperative position.

FIGS. 11 through 15 illustrate a modified form of the invention wherein a central hub 60 has a sprocket or ring gear 61 secured thereto but separated therefrom by a spacer 62. A plurality of spoke socket members 63 are secured to the hub 60 and extend radially outwardly therefrom. A wedge plate 64 extends into the socket 63 and a second wedge plate 65 welded therein binds the wedge plate 64 tightly in the socket 63. A bolt 66 extends through the wedge plate 64 the wedge plate 65 to secure them in the sockets 63. A stop plate 67 is mounted in the inner end of the sockets 63 to align the wedge plate 64 thereon. A second socket member 68 is rigidly secured to the wedge plate 64 and is adapted to receive a spring bar 69 which is rigidly secured therein. A socket member 70 is rigidly secured to the opposite end of the spring bar 69 and has a fluke plate 71 rigidly secured thereto. A fluke 72 on the fluke plate 71 has a carbide tip 73 detachably secured thereto.

Figure 20:
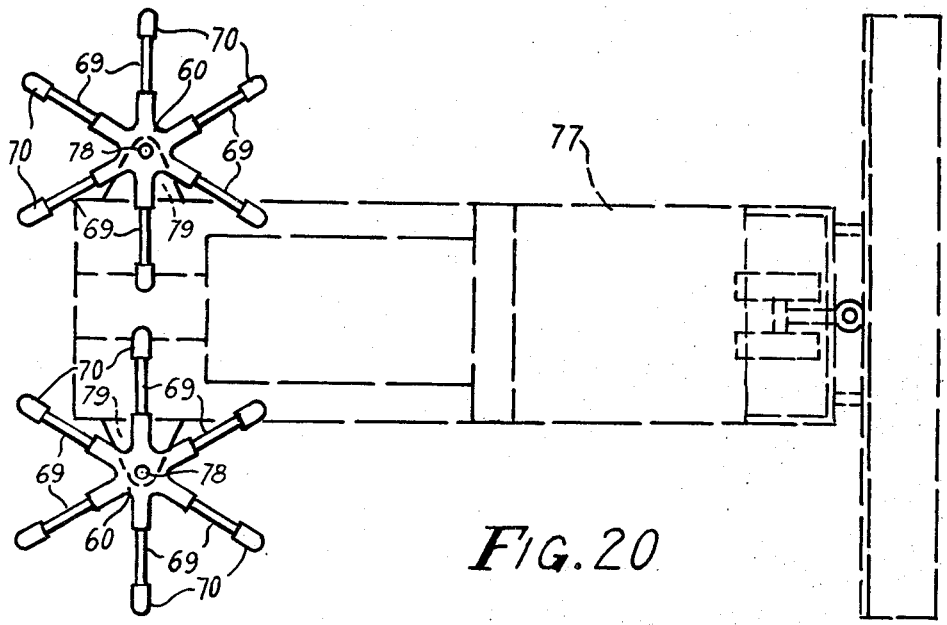
FIG. 20 is a top plan view of a vehicle showing the modified form of the invention as illustrated in FIG. 11 attached thereto.
Figure 21:
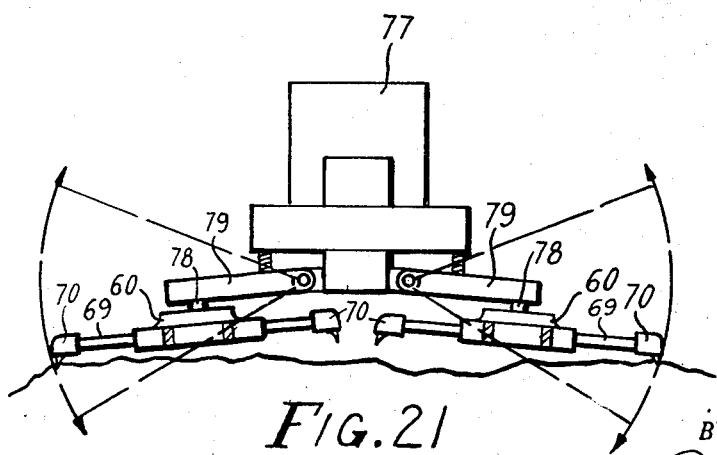
FIG. 21 is a front elevation of the structure illustrated in FIG. 20.

An eye 74 is secured to the socket 70 and an eye 75 is secured to the socket 68. A steel cable 76 extends between and connects the eye 74, 75 to secure the socket 70 to the socket 68 should the spring bar 69 break, to prevent the socket 70 and the carbide tip 73 from being dangerously projected into the air. The modified unit illustrated in FIGS. 11 through 15 is particularly adapted for a nearly horizontal mounting on a vehicle 77 as illustrated in FIGS. 20 and 21. The hubs 60 are secured to a nearly vertical axle 78 carried by swinging arms 79 on the vehicle 77.

The form of the invention illustrated in FIGS. 11 through 15 provides not only an improved cushioning traction drive device but also assist in supporting the vehicle of moderate weight for rough terrain transport.

The traction increasing attachments of the instant invention are designed to provide an improved primary or assisting traction for vehicles that owing to environmental conditions on land, snow, ice, or water require more efficient traction then the presently manufactured devices available on the market. The attachments when installed will give highly positive traction for vehicles whereever they are used. The installation can be at any point on the vehicle front, rear, or on the lateral sides thereof. The attachment will enable vehicles to ford streams, travel within deep or shallow streams, cross mountainous terrain, cross lakes, bogs, snow, glaciers, ice, sand, mud and streams containing boulders.

The attachment offers fundamental tractional advantages and high power couplings to terrain which accrue from the leverage of and the intermeshing of the spoke members to the terrain contours and obstacles.

Having thus described the preferred embodiment of the invention it should be understood that numerous structural modifications and adaptations may be resorted to without departing from the spirit of the invention.

What is claimed is:

1. A traction attachment for vehicles comprising a hub, means for securing said hub to a vehicle, a plurality of spoked sockets secured to said hub in circumferentially equispaced relation and projecting radially outwardly therefrom, a fluke plate mounted in said socket and detachably secured thereto, at least one fluke formed on the radial outer end of said fluke plate a carbide tip detachably mounted in said fluke for engagement with the ground, a plurality of shafts, means mounting one of said shafts to each of said fluke plates in horizontally extending relation, and a flexible traction increasing belt trained over said shafts.

2. A device as claimed in claim 1 wherein a pair of integral wedges engage said fluke plate in said socket to bind said fluke plate in said socket.

3. A device as claimed in claim 2 wherein a bolt extends through said socket, said fluke plate and said wedges to lock them together.

4. A device as claimed in claim 1 wherein said unit is detachably secured to a ground vehicle.

5. A device as claimed in claim 1 wherein said unit is detachably secured to a snow vehicle.

6. A device as claimed in claim 1 wherein said unit is detachably secured to a water vehicle.

7. A device as claimed in claim 1 including a plurality of pockets on each of said belts with said shafts received in said pockets.

* * * * *